March 15, 1966 F. G. HEIMANN 3,240,523
DOOR LOCK
Filed Oct. 18, 1963
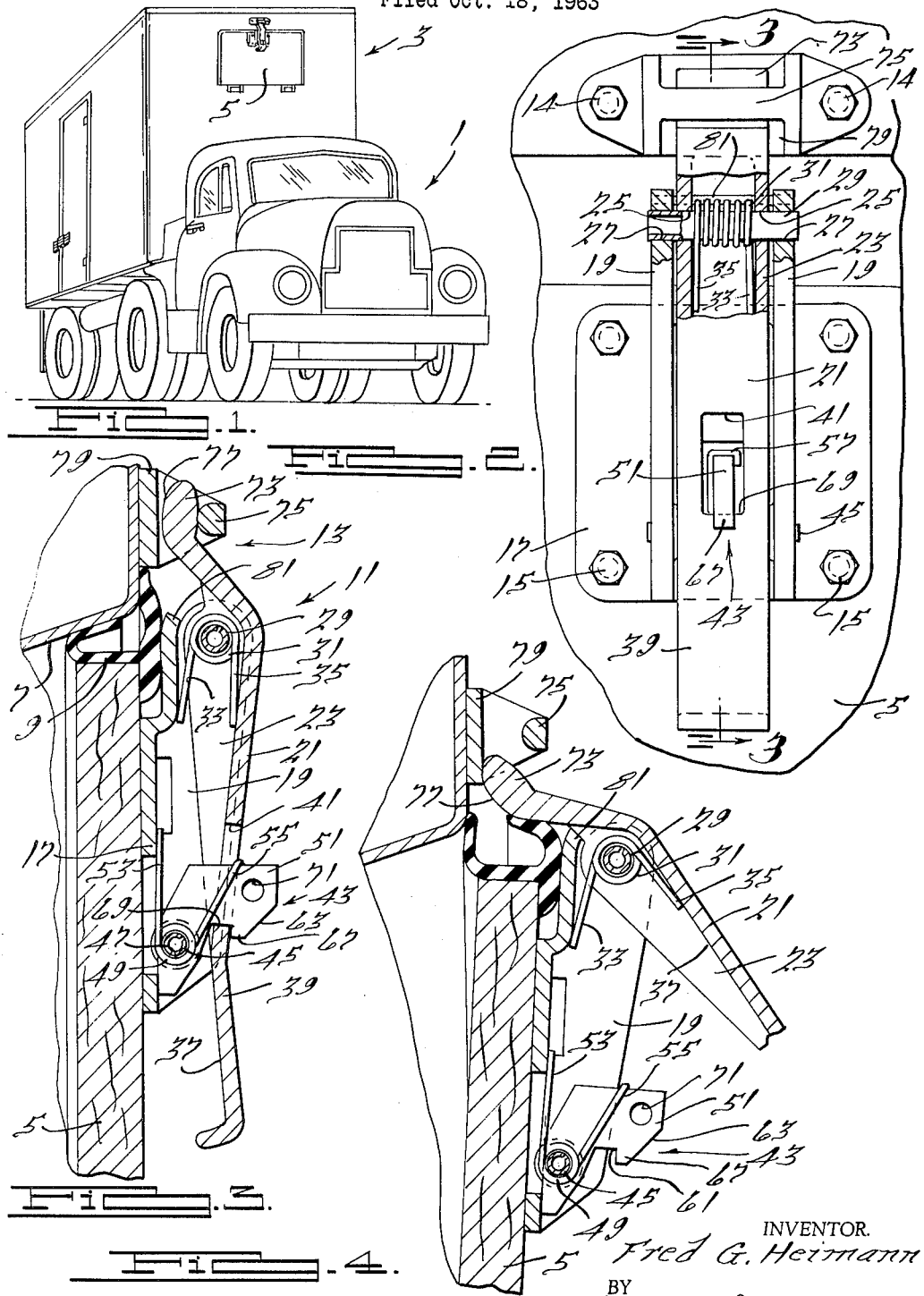
INVENTOR.
Fred G. Heimann
BY
Harness, Dickey & Pierce
ATTORNEYS

United States Patent Office 3,240,523
Patented Mar. 15, 1966

3,240,523
DOOR LOCK
Fred G. Heimann, Mount Clemens, Mich., assignor to Fruehauf Corporation, Detroit, Mich., a Michigan corporation
Filed Oct. 18, 1963, Ser. No. 317,350
5 Claims. (Cl. 292—198)

This invention relates generally to door locks and more particularly to an improved lock for the venting door of refrigerated trucks, trailers and the like.

The increased use of refrigerated trailers for the transport of meat, perishable goods, etc., has emphasized the need for improved refrigeration facilities on such vehicles. It is often required to vent such refrigerated vehicles through an aperture or door located on the front end wall of the trailer van which is of necessity located above the tractor to maximize air flow therethrough. However, such positioning of the vent door is, for example, 12 to 15 feet above the ground and renders the door relatively inaccessible to the vehicle operator. A door lock for such a vent door must therefore be operable from the ground as by using a pole or other implement.

Such vent door locks for refrigerated trailers are often relatively difficult to close because of the relatively heavy seals that must be provided between the door and the front wall of the trailer to preclude excessive heat flow into the trailer van. On the other hand, such doors are often hard to open due to accumulated frost around the door. Thus, a door lock must not only be capable of relatively easy operation from a remote position but must also produce both opening and closing mechanical advantages to overcome the aforementioned resistance forces.

A door lock, in accordance with the instant invention, is well suited to the solution of the aforementioned problems in that it is capable of remote operation as by a pole, exhibits a mechanical advantage for both closing and opening of the door, and is self-closing and self-locking due to closing movement of the door.

Accordingly, one object of the instant invention is to provide an improved door lock.

Another object is the provision of an improved vent door lock for a refrigerated truck, trailer or the like.

Another object is an improved door lock that exhibits both an opening and closing mechanical advantage.

Another object is a door lock that is operable from a remote location.

Another object is a door lock that is self-closing and self-locking when operated by the inertia of the associated door.

Other objects and advantages of the invention will be apparent from the following specification, claims and drawing, wherein:

FIGURE 1 is a perspective view of a van type trailer having a vent door with the improved door lock of the instant invention;

FIGURE 2 is a view, partially broken away, of the door lock shown in FIGURE 1;

FIGURE 3 is a cross-sectional view taken substantially along the line 3—3 of FIGURE 2; and FIGURE 4 is a view similar to FIGURE 3 showing the door lock in the opening condition.

Referring now to FIGURES 1 to 3 of the drawing, particularly noting FIGURE 3, there is illustrated a tractor and a refrigerated trailer assembly 3, the trailer 3 having a vent door 5 on the front wall thereof which permits air to flow to the interior of the trailer for ventilation purposes through a vent 7. This vent door is positioned at the upper extremity of the trailer wall to maximize the air flow therethrough and to provide sufficient clearance for the vertical dimension of the vent door 5 when it is lowered into use. The trailer 3 being usually refrigerated, there is provided on the periphery of the vent door suitable sealing grommets 9 to prevent loss of cold air from the interior of the trailer 3 as is known in the art. Mounted at the upper extremity of the vent door is a door lock assembly 11 which operatively engages a keeper unit 13 suitably mounted adjacent the upper periphery of the vent aperture 7 by bolts 14.

The door lock assembly 11 is mounted on the vent door 5 by means of bolts 15 through a base plate 17 of the lock assembly 11. Integrally formed on the base plate 17 are two laterally spaced side plates 19 forming a handle mount yoke which serves to mount a handle assembly. The handle assembly includes a handle means 21 which has integrally formed thereon two laterally spaced extensions 23 which are adapted to be received between the mounting yoke 19 of the base plate 17. Formed in the handle side extensions 23 are a pair of aligned holes 25 which are, in turn, aligned with a second pair of aligned holes 27 formed in the base side plates 19, the four holes 25, 27 being so positioned as to receive a handle pin 29. The handle means 21 is resiliently and pivotably received on the handle pin 29, resiliency being provided by a torsion spring 31 positioned between the handle side extensions 23 and also being received on the handle pin 29. The resilient action is accomplished through tensioning of the spring 31 by confining a pair of extensions 33, 35 of the spring 31 between the base plate 17 and the handle means 21 as is seen in FIGURE 3. The first extension 33 is positioned against the base plate 17 and the second extension 35 is positioned against the bottom of the handle 37 to urge the handle 21 in a counterclockwise direction.

The handle means 21 is provided with an elongated extension 39 providing a lever arm which, when pivoted, will provide the force necessary to free the vent door 5 from the action of frost usually found within a refrigerated trailer. Formed at the lower end of the elongated extension of the handle is an aperture 41 adapted to receive a latch assembly 43 which assembly provides a lock for the handle means 21 while it is in a closed position. This latch assembly 43 is suitably mounted on a latch pin 45 which is positioned in a third pair of holes 47 formed in the side plates 19 in a manner similar to the method of mounting the handle means 21. This latch assembly 43 is resiliently mounted on the pin 45 by means of a latch torsion spring 49 mounted on the latch pin 45 which operates to urge a latch 51 in a downward position. The resilient operation of the latch 51 is accomplished by providing the torsion spring with two ends 53, 55, one of which, 53, engages the base plate 17 to restrict the movement of that end in one direction and the other end 55 of which is provided with a hook 57 (FIGURE 2) engageable with an edge of the latch 51 to resiliently urge the latch 51 in a downward direction.

The latch 51 is formed with a groove 61 in a lower edge and a camming surface 63 at one corner thereof. The groove 61 and surface 63 are separated by a retaining shoulder 67 which serves to lock the handle means 21 in the closed position by engaging the lower end 69 of the aperture 41 formed in the handle 21 when the handle is operated into engagement with the latch 51. The shoulder 67 locks the handle means 21 in the closed position against the action of the handle torsion spring 31.

As the handle means 21 is pivoted into the closed position the lower portion 69 of the aperture formed in the handle 21 engages the camming surface 63 formed at one corner of the latch 51 and this camming surface 63 is pivotally urged upwardly by the handle 21 to displace the shoulder 67 in such a manner as to allow the handle 21 to be pivoted into position below the groove 61 formed in the latch 51. When this position is reached, the latch torsion spring 49 urges the latch 51, with its groove 61, into engagement with the lower portion 69 of the aperture formed in the handle 21. In this manner the handle 21 is locked in the closed position. The latch 51 is further provided wtih a hole 71 therein which is adapted to receive a hasp of a padlock (not shown) if it is desired to lock the vent door 5. When the vent door 5 is closed, the hasp is inserted into the hole 71 and the padlock is locked thus precluding the handle 21 from being pivoted free of the latch 51.

The upper portion of the handle 21 is provided with a camming lug 73, the upper surface of which engages a retaining bar 75 on the keeper unit 13. This retaining bar 75 serves to engage the lock assembly 11 and thus hold the door 5 in a closed position when the door is not in use for ventilation. When the latch 51 is released, allowing the handle 21 to pivot upwardly under the action of the handle torsion spring 31 (as shown in FIGURE 4), the camming lug 73, having a camming surface 77 formed thereon, operatively engages a striker plate 79 which serves to form a rigid surface for applying a force to pivot the vent door 5 about its lower hinges. This force is provided by the handle torsion spring 31 and is effectively applied to the striker plate 29 by the handle 21, forcing the upper portion of the door outwardly and breaking the seal formed by the frost within the trailer container itself. If the seal is of such magnitude that the torsion spring 31 cannot break it, a pole is used to apply a further force at the handle 21 by an operator. In this manner the force used to open the door 5 by the operator may be multiplied by the action of a long lever arm provided in the elongated portion 39 of the handle 21. As the door 5 continues to pivot. the handle 21 is forced outwardly by the action of the torsion spring 31 until the spaced extensions 23 of the handle hit a base plate extension 81 thereby limiting the pivotal movement of the handle 21. This base plate extension 81 is so dimensioned as to exactly position the camming lug 73 at the lower end of the striker plate 79 when the handle 21 is in its fully extended position and the door 5 is in position over the vent 7 and about to close. In this way, when the door 5 is pivoted to the closed position, the camming lug 73 will hit the lower end of the striker plate 79, but not below that point. If the lug 73 should strike below the striker plate 79, the camming lug would not operate to pivot the handle downward and the door would remain open.

When the door is pivoted upwardly to the closed position by the operator, the camming surface 77 engages the lower end of the striker plate 79 and the mass of the door forces the door into the closed position. The camming surface 77 on the lug operates to urge the handle 21 in the down position against the force of the handle torsion spring 31 by angular movement thereof about the handle pin 29 until such time as the lower end of the aperture 69 formed in the handle 21 engages the upper portion of the camming angle 63 formed on the latch 51. The mass of the door continues to carry the door inwardly and the handle 21 continues its clockwise motion. The interaction of the lower portion 69 of the aperture formed in the handle 21 and the camming surface 63 formed on the latch 51 cams the latch 51 upwardly of the line of travel of the handle 21. In this manner the latch 51 will not impede the closing of the door 5 and the urging of the handle 21 into the closed position. When the lower edge 69 of the aperture is in position below the groove 61 formed in the latch 51, the latch 51 will pivot downwardly under the action of the latch torsion spring 55 locking the handle 21 into the closed position.

To open the door the operator standing on the ground places a pole in a position at a point near the camming surface 63 of the latch 51. With an upward thrust the latch 51 is struck at the camming surface 63 by the point of the pole, pivoting the latch 51 upwardly on the latch pin 49. As the shoulder 67 clears the lower portion 69 of the aperture formed in the handle 21, the handle 21 is urged outwardly by the action of the torsion spring 31. This outward movement forces the camming lug 73 inwardly against the striker plate 79, the effect of which is to commence the opening of the vent door 5 against the seal of frost or the like. If the action of the handle torsion spring 31 is insufficient to completely open the door, the operator places the pole at the under portion 37 of the handle and applies a force such to pivot the handle 21 about the handle pin 29. Through the further camming action of the camming lug 73 the door is freed from the trailer wall and the frost seal is broken. The door then drops open against the lower portion of the trailer wall under its own weight with the handle 21 remaining extended by means of the torsion spring 31.

Thus, it is seen that the above described assembly is designed to be easily operative from a remote position by an operator using a pole. Design of the opening and closing mechanism is such as to provide a relatively easy method of closing and opening the vent door 5 without the need of the operator mounting the roof of the tractor to break the frost seal or to close the door against the action of the sealing grommets.

While it will be apparent that the preferred embodiments of the invention are well calculated to fulfill the objects above stated, it will be appreciated that the invention is susceptible to modification, variation and change without departing from the proper scope or fair meaning of the subjoined claims.

What is claimed is:

1. A door lock assembly adapted to be operatively connected to a door for operating the door to an open and a closed position comprising:

a keeper adapted to be mounted adjacent the door having striker means,
   a handle assembly fixedly mounted on an outside surface of the door including rigid handle means, said handle means having a first portion and a second portion and pivotally mounted for movement from a first position with said first portion in engagement with said keeper to a second position with said first portion out of engagement therefrom,
   resilient means for urging said handle means toward said second position and moving the door to the open position when the door is closed, and
   latch means engageable with said second portion of said handle means and resiliently operable to retain said handle means in said first position,
   said latch means being operable from a remote position outside the door by a blow against the latch means to release said handle assembly for permitting said handle means to move to said second position and open the door.

2. A door lock assembly adapted to be operatively connected to a door for operating the door to an open and a closed position comprising:

a keeper adapted to be mounted adjacent the door and having a striker plate thereon,
   a handle assembly fixedly mounted on an outside surface of the door including rigid handle means, said handle means having a first portion and a second portion and pivotally mounted for movement from a first position with said first portion in engagement with said keeper to a second position with said first portion out of engagement therefrom having,
   camming means on a surface of said first portion for engaging said striker plate to urge said handle means from said second to said first position, resilient means for urging said handle means toward said second position and moving the door to the open position when the door is closed, and latch means engageable with said second portion of said handle means and resiliently operable to retain said handle means in said first position, said latch means being operable from a remote position outside the door by a blow against the latch means to release said handle assembly for permitting said handle means to move to said second position and open the door.

3. A door lock assembly adapted to be operatively connected to a door for operating the door to an open and a closed position comprising:

a keeper adapted to be mounted adjacent the door having striker means, a handle assembly fixedly mounted on an outside surface of the door including rigid handle means, said handle means having a first portion and a second portion and pivotally mounted for movement from a first position with said first portion in engagement with said keeper to a second position with said first portion out of engagement therefrom, resilient means for urging said handle means toward said second position and moving the door to the open position when the door is closed, and latch means engageable with said second portion of said handle means and resiliently operable for movement to a first position to retain said handle means in said first handle position and having, camming means formed thereon engageable with said second portion of said handle means, and said latch camming means being operable from a remote position outside the door with a blow against the latch means to urge said latch means to a second position remote from said first latch position when said second portion of said handle means engages said camming means thereby permitting movement of said handle means to said second handle position.

4. A door lock assembly adapted to be operatively connected to a door for operating the door to an open and a closed position comprising:

a keeper adapted to be mounted adjacent the door, a handle assembly fixedly mounted on an outside surface of the door including rigid handle means, said means having a first portion and a second portion and pivotally mounted for movement from a first position with said first portion in engagement with said keeper to a second position with said first portion out of engagement therefrom having, camming means on a surface of said first portion for engaging said keeper means and operative to urge said handle means from said second to said first position, resilient means for urging said handle means toward said second position and moving the door to the open position when the door is closed, and latch means engageable with said second portion of said handle means and resiliently operable for movement to a first position to retain said handle means in said first handle position and having, camming means formed thereon engageable with said second portion of said handle means, and said latch means camming means being operable from a remote position outside the door with a blow against said latch means to urge said latch means to a second position remote from said first latch position when said handle means engages said camming means thereby permitting movement of said handle means to said second handle position.

5. A door lock assembly adapted to be operatively connected to a door for operating the door to an open and a closed position comprising:

a keeper mounted adjacent the door having a striker plate integrally formed therewith, a handle assembly adapted to be mounted adjacent the door including handle means pivotally mounted for movement from a first position in engagement with said keeper to a second position out of engagement therefrom, said handle means having a camming surface at one end thereof engaging said striker plate for applying a force to open the door when said handle means is moved to said second position and having an aperture formed remote from said first end of said handle means, resilient means for urging said handle means toward said second position, and latch means operable from a remote position outside the door by a blow against said latch means including means formed thereon positioned for engagement with said handle adjacent said aperture and retaining said door in said first position and camming means resiliently engageable with said handle adjacent said aperture for urging said camming means remote from said latch position when said handle means engages said latch camming means thereby permitting movement of said handle means to said first handle position.

References Cited by the Examiner

UNITED STATES PATENTS

| 231,401 | 8/1880 | Cleveland. | |
|---|---|---|---|
| 1,153,514 | 9/1915 | North et al. | 292—210 |
| 1,957,642 | 5/1934 | Hansen | 292—210 X |
| 2,429,805 | 10/1947 | Conner | 292—210 X |

FOREIGN PATENTS

| 14,005 | 1890 | Great Britain. |
|---|---|---|
| 97,207 | 10/1939 | Sweden. |

JOSEPH D. SEERS, *Primary Examiner.*

M. HENSON WOOD, JR., *Examiner.*